Jan. 23, 1962     W. F. HERLIHY     3,017,645
SHOE UPPER MOLDING APPARATUS
Filed June 23, 1960     2 Sheets-Sheet 1

INVENTOR.
William F. Herlihy
BY
Roberts Cushman Grover
ATT'YS

Jan. 23, 1962  W. F. HERLIHY  3,017,645
SHOE UPPER MOLDING APPARATUS
Filed June 23, 1960  2 Sheets-Sheet 2
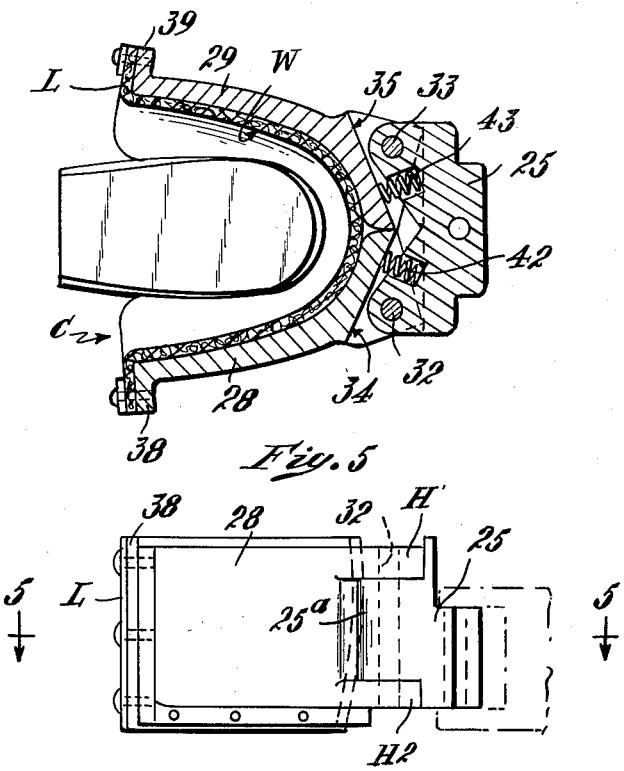
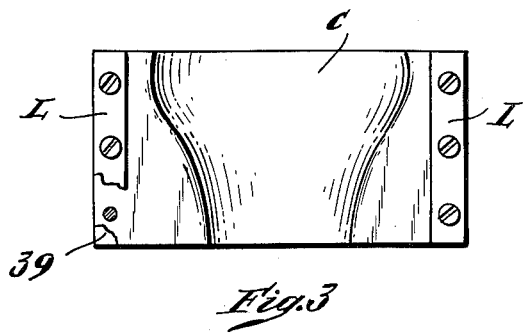
INVENTOR.
William F. Herlihy
BY
ATT'YS

United States Patent Office 3,017,645
Patented Jan. 23, 1962

3,017,645
SHOE UPPER MOLDING APPARATUS
William F. Herlihy, Haverhill, Mass., assignor to Lowell Counter Company, Lowell, Mass., a copartnership
Filed June 23, 1960, Ser. No. 38,285
8 Claims. (Cl. 12—54.3)

This invention pertains to apparatus for use in shaping, by molding pressure, the rear portion of a shoe upper preparatory to lasting, being of particular utility in the practice of that method of shoe manufacture in which a flat stiffener or counter blank is assembled with the upper before the latter is molded. A machine of this general type is disclosed, by way of example, in the patent to Lauretti, No. 2,915,765, December 8, 1959.

Machines of the above type comprise in general, a plug or shaping form, which in reality is a last for the rear end only of the upper and which is usually stationary. Cooperable with this plug there is an expansible-contractable outer mold unit comprising rigid, hingedly connected parts. This outer mold unit is customarily provided with a flexible lining of leather or the like. The machine also comprises means for advancing and retracting said outer mold unit relatively to the plug or form, and means operative, as the outer mold unit advances so as to embrace an upper (whose rear portion envelops the plug) to contract the mold unit so as to apply molding pressure to the upper while at the same time stressing the upper forwardly about the plug.

Heretofore it has been deemed desirable to employ an outer mold unit comprising three independent parts, that is to say, a rear central portion and two side or wing portions hinged to the rear portion so that they may move toward or away from each other with means for moving the side member toward the plug as the mold unit advances. For the latter purpose it has been customary to employ cams, levers or the like located externally to the mold unit and which occupy substantial space at the opposite sides of the plug, for applying inward pressure to the wings of the mold unit as the latter advances.

The present invention has for objects, the simplification of apparatus of the above type, in particular with respect to the outer mold unit as, for example, by reduction in the number of parts which define the mold cavity of the outer mold unit to two and the elimination of externally located actuating means for contracting the mold, thereby reducing the cost and leaving ample space at opposite sides of the plug to facilitate the application of the shoe upper and stiffener, and also lessening the danger of injury to the operator's hands. A further object is to provide an improved mold unit which, in operation, shows less tendency to abrade or otherwise injure the shoe upper than is true of molds such as heretofore have been employed.

Other and further objectives and advantages of the invention will be pointed out in the following more detailed description and by reference to the accompanying drawings, wherein:

FIG. 3 is a front elevation of the mold unit;

FIG. 4 is a side elevation of the mold unit, a portion of the carrier for the unit being shown in broken lines;

FIG. 5 is a horizontal section on the line 5—5 of FIG. 4;

Figure 1:
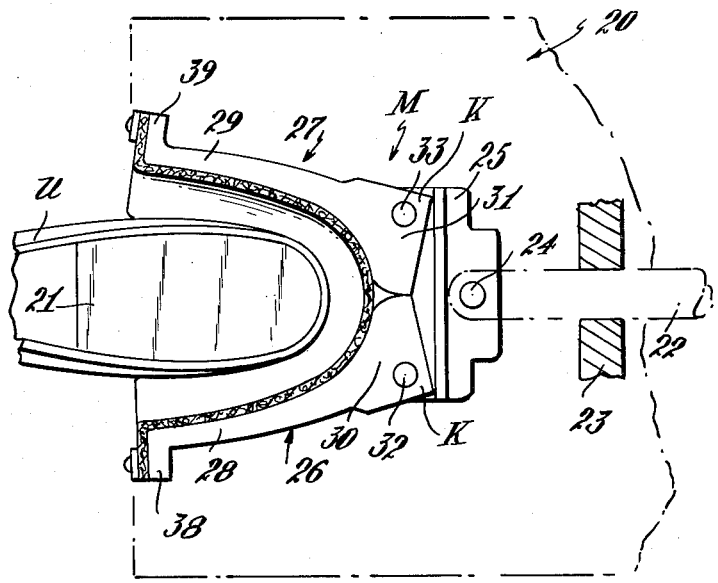
FIG. 1 is a fragmentary horizontal section showing the plug or inner form and an outer mold unit according to the present invention, together with means, which may be of conventional nature, for advancing and retracting the mold unit.

Referring to FIG. 1 of the drawings, the numeral 20 indicates diagrammatically, a portion of the frame of a machine of the general type above referred to, upon which is mounted the block or plug 21. While this plug is normally fixed in position it is usual to mount this element on the machine frame for adjustment and also to permit its ready replacement by a similar plug but of a different size or shape. This so-called "plug" is, in reality, a partial last, usually of metal, designed to impart the desired shape to the interior of the shoe upper, which is being molded. Cooperable with this block or partial last is the outer mold unit M, which is arranged to be moved toward and from the plug 21 and in moving toward the plug to apply molding pressure to the upper U of a shoe which has been arranged so as partially to embrace the plug 21.

Figures 2, 6, 7, 8:
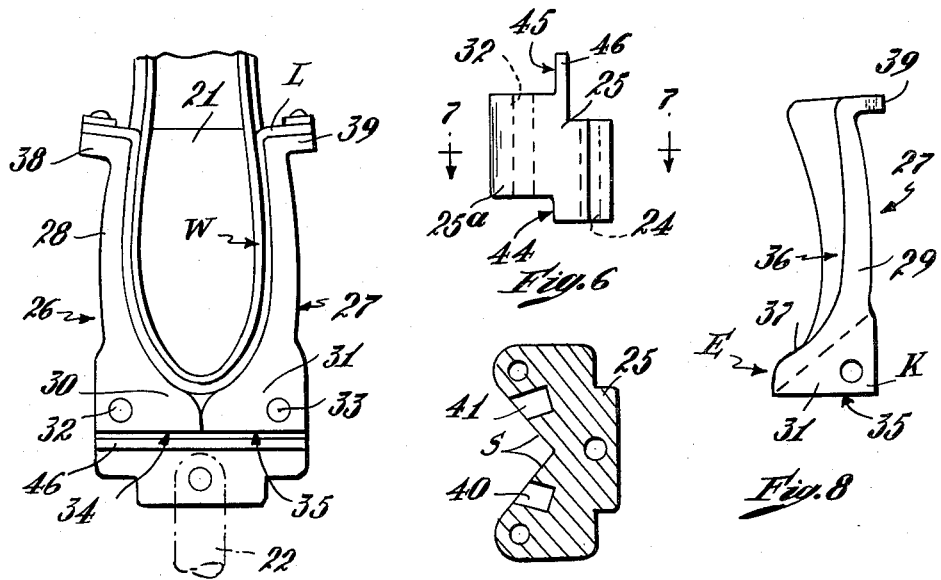
FIG. 2 is a plan view of the mold unit itself, separate from other parts and showing it in its advanced and contracted condition.
FIG. 6 is a side elevation of the rear member of the mold unit.
FIG. 7 is a horizontal section on the line 7—7 of FIG. 6.
FIG. 8 is a plan view of one of the wing members of the mold unit, separated from other parts.

As shown in FIG. 1, the machine comprises a rod 22, which slides in bearings 23 and which may be moved back and forth from front to rear by any suitable actuating means such, for example, as a piston in a cylinder or by means of a power driven crank and connecting rod or equivalent means. Any conventional means, treadle-actuated, for example, may be provided for controlling the forward and rearward motions of the rod 22. To the forward end of rod 22 there is connected, by means of a pin 24, the rear member or carrier 25 for the mold unit M. To this carrier member there are secured wings 26 and 27 which are alike except that one is the reverse of the other, one being at the right hand and the other at the left hand side of the plug or block 21. Each of these wings comprises a rigid bell-crank lever. The respective levers have the long forwardly extending arms 28 and 29, respectively, and the relatively short inwardly directed arms 30 and 31. These levers are mounted on the carrier member 25 to swing toward and from each other about parallel vertical pivot pins 32 and 33. At their rear ends the short arms 30 and 31 of these levers have substantially flat surfaces 34 and 35 respectively, which, when the mold is retracted from the plug as shown in FIG. 2 of the drawings, converge forwardly toward each other so as to intersect at an obtuse angle.

The inner face 36 (FIG. 8) of the long arm 29 of the left hand lever is shaped to conform generally to the shape of the left lateral surface of the plug 21, while the short arm 31 of the same lever has a curved inner face 37, which substantially conforms to the curvature of the left hand half of the rear part of the plug 21. It will be understood that the opposite lever has correspondingly shaped surfaces. The surfaces 36 and 37 of the two levers, collectively define the contour of the mold cavity C and, if desired, these surfaces may be those which actually contact the shoe upper U during the molding operation. However, it is preferred to provide the mold cavity with a lining, such as a single piece of leather L, desirably arranged so that its opposite ends are fixed to flanges 38 and 39 extending outwardly from the forward ends of arms 28 and 29 respectively, the inner surface W of this strip of leather or similar, somewhat resilient and flexible material, being that which actually contacts the shoe upper. Such a lining, having a certain degree of resiliency, is preferable to metal as less liable to injure the surface of the shoe upper, and also, since it exerts a substantial forward frictional force on the upper as the mold unit advances, thereby draw the upper snugly about the plug 21.

The rear or carrier member 25 of the mold unit is provided at its front with substantially flat surfaces S which converge rearwardly and intersect at the middle point of the rear member, these surfaces having bores 40 and 41 whose axes are substantially perpendicular to said surfaces S and which form pockets for the reception of coiled compression springs 42 and 43 respectively. These springs bear against the surfaces 35 of the bell-crank levers and exert force upon the latter tending to swing the long arms of the levers apart as shown in FIGS. 1 and 5.

In order to limit such outward movement, the rear member 25 is provided with faces 44 and 45 (FIG. 6) (the latter face being at the front side of an upwardly projecting flange 46) with which the corners K of the levers contact when the levers have been swung away from each other to the maximum desired extent.

As illustrated in FIG. 4, the short arms of the levers are preferably bifurcated at their rear corners to provide the upper and lower portions $H^1$ and $H^2$, which receive between them the forward portion 25A (FIG. 6) of the rear carrier member 25. The pivot pins 32 extend downwardly through coaxial bores in parts $H^1$, 25A and $H^2$.

When the piston rod 22 is retracted to its rearmost position the outer molding unit M has its wings 26 and 27 relatively disposed as shown in FIGS. 1 and 5. In this position the rear portion of the shoe upper U may be drawn about the fixed plug 21 as shown in FIG. 1. When the piston rod now moves forwardly, the rear portion of the wall of the mold cavity will first come into contact with the shoe upper at the extreme rear end of the latter and as the mold unit M continues to move forwardly, pressure is exerted upon the short arms 30 and 31 of the bell-crank levers (which initially occupy the positions shown in FIGS. 1 and 5) and the pressure thus exerted swings the short arms of the levers rearwardly, it being noted that the opposite ends of these levers are smoothly rounded, as shown at E (FIG. 8) so that the levers may rock freely and as they rock cause the long arms 28 and 29 to approach and exert a powerful molding pressure against the outer surface of the shoe upper, thus conforming the latter to the shape of the plug 21. It may be noted that the plug 21 is usually heated, for example, by interior electrical heating coils (not shown) and when the wings of the outer mold are forced inwardly against the upper, pressing the latter against the heated plug, the upper is shaped to a predetermined contour such that little, if any, further shaping is necessary at this part of the upper during the subsequent lasting operation.

It will be appreciated from the above description, that the contraction of the mold cavity results solely from the pressure of the shoe upper exerted against the short arms 30 and 31, so that no external mechanism is required. Thus the space to the left and right of the plug 21 is open and free from moving parts, so that application of the shoe upper to the plug is facilitated and all danger of injury to the operator is eliminated.

While one suitable embodiment of the invention has herein been illustrated by way of example, it is to be understood that the invention is broadly inclusive of any and all modifications falling within the scope of the appended claims.

I claim:

1. A mold unit for use in shaping the rear portion of a shoe upper, said mold unit comprising a rear member and relatively movable rigid wings having portions which collectively define the side and rear walls of a mold cavity, means so pivotally connecting said wings to said rear member of the mold unit that they may rock in opposite directions, respectively, about spaced parallel axes, each wing comprising a rigid bell-crank lever having a long arm and a short arm, the levers being so arranged that the free ends of the short arms of the levers are adjacent to each other, the long arms of the levers being shaped to define the side walls of the mold cavity and the short arms of the levers being shaped so as collectively to define the rear wall of the mold cavity, and resilient means normally urging said levers to rock in opposite directions, thereby to expand the mold cavity and to position the short arms of the levers so that they converge forwardly at an obtuse angle, whereby rearwardly directed force, applied to the free ends of the short arms of the levers, rocks the levers in opposition to said resilient means and moves the side walls of the cavity towards each other.

2. A mold unit according to claim 1 wherein the inner surfaces of the long and short arms of each bell-crank lever are curved respectively to correspond to the shape of a side wall and a portion of the rear wall of the desired mold cavity.

3. A mold unit according to claim 1 wherein the free ends of the long arms of the bell-crank levers are provided with outwardly directed flanges, and a flexible element having its opposite ends secured to the respective flanges and which extends from one flange to the other and contacts the inner surfaces of both of said levers.

4. A mold unit according to claim 1 wherein the ends of the short arms of the bell-crank levers are of arcuate shape so that they do not interfere with each other as the levers rock.

5. A mold according to claim 1 wherein the rear member of the mold unit has a flange which constitutes a stop engageable by the walls of the bell-crank levers to limit the motion imparted to the latter by springs.

6. A mold unit according to claim 1 wherein the rear member of the mold unit has therein spaced bores whose axes converge forwardly and a coil compression spring in each of said bores, the short arm of each respective lever having a flat surface substantially perpendicular to the axis of the corresponding bore and forming an abutment for the forward end of the respective spring.

7. A mold unit for use in a machine for molding the rear portion of a shoe upper and which comprises a normally stationary plug and a reciprocable actuating element by means of which the mold is advanced towards or retracted from the plug, the mold unit comprises a rear member designed to be attached to said reciprocable part and a pair of wings hingedly connected to the rear member to rock about transversely spaced vertical axes and which collectively define a mold cavity open at its forward end, each wing member comprising a rigid bell-crank lever having a relatively short rear arm and a relatively long forward directed arm, the hinge axis of each wing being located in the angle between the long and short arms of the wing, the levers being so arranged that the free ends of their shorter arms are closely adjacent to each other, spring means tending to rock the levers oppositely so as to move their longer arms outwardly away from each other, and means limiting such motion of the levers so that normally their shorter arms converge forwardly, whereby, when the mold unit is advanced into operative relation to the plug, the resultant pressure exerted against the free ends of the short arms of the levers pushes the free ends of the short arms rearwardly and causes the levers to rock so that their longer arms move inwardly to constrict the mold cavity.

8. In combination, in a machine for use in molding the rear portion of a shoe upper, and which includes a normally stationary inner mold element or plug, and a movable outer mold unit, a reciprocable actuating element, by means of which said mold unit may be advanced toward or retracted from the plug, said mold unit comprising a rear member and relatively movable rigid wings having parts which collectively define the side and rear walls of a mold cavity open at its forward end and normally of a size to receive the plug freely as the mold unit is advanced, means securing the rear member of the mold unit to said actuating element, and means so pivotally connecting each of said wings to said rear member of the mold unit, that said wings may rock in opposite directions respectively, about spaced parallel axes, the wings being so shaped and arranged that rearward pressure, directed against the inner surface of the rear wall of the mold cavity, provides the only force requisite to move the side walls of the mold unit toward each other so as operatively to contract the mold cavity.

References Cited in the file of this patent

UNITED STATES PATENTS

| | | |
|---|---|---|
| 1,165,482 | Young | Dec. 28, 1915 |
| 1,280,303 | Ricks | Oct. 1, 1918 |
| 2,266,774 | Lawson | Dec. 23, 1941 |
| 2,915,765 | Lauretti | Dec. 8, 1959 |

FOREIGN PATENTS

| | | |
|---|---|---|
| 4,433 | Great Britain | of 1915 |
| 196,167 | Great Britain | Apr. 19, 1923 |